United States Patent [19]

Arnold

[11] Patent Number: 4,495,321

[45] Date of Patent: Jan. 22, 1985

[54] POLYIMIDE AND/OR POLYAMIDE-IMIDE COMPOSITIONS IN MIXED SOLVENTS

[75] Inventor: Mary T. Arnold, Upland, Pa.

[73] Assignee: Atlantic Richfield Company, Los Angeles, Calif.

[21] Appl. No.: 562,680

[22] Filed: Dec. 19, 1983

[51] Int. Cl.³ .............................................. C08L 79/08
[52] U.S. Cl. .................................... 524/104; 524/359; 524/600
[58] Field of Search ................. 524/94, 104, 359, 600

[56] References Cited

U.S. PATENT DOCUMENTS

| | | | |
|---|---|---|---|
| 3,364,166 | 1/1968 | Barito | 524/600 |
| 3,497,468 | 2/1970 | Ulmer | 524/600 |
| 3,501,443 | 3/1970 | Di Leone | 524/359 |
| 3,607,814 | 9/1971 | Di Leone | 524/359 |
| 3,655,606 | 4/1972 | Lucas | 524/359 |
| 3,817,927 | 6/1974 | Kovacs et al. | 524/600 |
| 3,856,752 | 12/1974 | Bateman et al. | 524/600 |
| 3,937,673 | 2/1976 | Koerner et al. | 524/600 |
| 4,374,221 | 2/1983 | McGregor et al. | 524/94 |

*Primary Examiner*—Lester L. Lee
*Attorney, Agent, or Firm*—Delbert E. McCaslin

[57] ABSTRACT

Improved polyimide and/or polyamide-imide coating compositions are provided for use as magnet wire coatings which comprise a polyimide and/or polyamide-imide polymer and a co-solvent mixture of N-methyl pyrrolidone and acetophenone the solids content of the solution being between about 5 percent and 40 percent by weight based on the total weight of solution.

5 Claims, No Drawings

POLYIMIDE AND/OR POLYAMIDE-IMIDE COMPOSITIONS IN MIXED SOLVENTS

BACKGROUND OF THE INVENTION

Polyimide and polyamide-imide resins and processes for their preparation are well known in the prior art. Such resins, which are high heat resistant polymers, have particular usefulness in the aerospace industry and as magnet wire coatings. The rate of growth and use of these resins has, however, found some limitations due to the solvents required for their application. Difficulties have been encountered in coatings applications to obtain consistent, smooth coatings on certain substrates because of such solvents. In addition, it is generally known that there are relatively few solvents that will solubilize or are compatible with polyimides or polyamide-imides. It is therefore highly desirable to provide the polyimide and polyamide-imide resins in a useful molecular weight in solvents which give solutions having desirable low viscosities and relatively high polymer resin content.

Acetophenone has been found to have a very high degree of solvency for polyimides and polyamide-imides but cannot generally be employed as the sole solvent for such polymer solutions. It has been discovered that, in addition to providing an economical solvent system, acetophenone can be used in conjunction with N-methyl pyrrolidone in amounts of up to 90% by weight of the total solvent mixture down to 5 percent solids. Clear, uniform coatings on magnet wire are obtained on curing when the acetophenone-N-methyl pyrrolidone mixed solvent system is employed with polyimide and/or polyamide-imide resins.

N-methyl pyrrolidone used in the preparation of aromatic polyamide-imide resins is also a good solvent and the polyimides and polyamide-imide polymers are often sold commercially as certain percent solids solutions in N-methyl pyrrolidone (NMP). Other common solvents such as xylene, acetone or ethanol are incompatible with the resins and can be used in very small percentages in an N-methyl pyrrolidone solution of the polymer resins. Cresylic-phenol type solvents can be used but suffer from their toxic nature.

Prior art solvent systems for polyamide-imide and/or polyimide resins are known in the art. U.S. Pat. No. 3,501,443 discloses a process for the preparation of polyimide resins in the presence of acetophenone, cyclohexanone, isophorone, proprophenone or benzophenone. U.S. Pat. No. 3,607,814 shows a composition comprising a polyimide and a mixture of solvents comprising butyrolactone along with cyclohexaneone, acetophenone, isophorone, benzophenone or propisophenone wherein the solids content of the polyimide in solution is between 5 and 30 percent by weight based on the total weight of solution. U.S. Pat. No. 3,677,992 teaches the use of a mixture of a phenol or a substituted phenol or o-, m-, or p-cresol along with aromatic ketones such as benzophenone and acetophenone as a solvent system for polyamide-imide resins as magnet wire coating compositions. U.S. Pat. Nos. 3,884,880 and 3,937,673 disclose the use of acetophenone and N-methyl pyrrolidone as reaction sovents, the reaction being quenched by adding aprotic or polar solvents or phenolic solvents such as cresylic acid, phenol, cresol or the like.

SUMMARY OF THE INVENTION

This invention relates to improved polyamide-imide and/or polyimide coating compositions comprising a polyamide-imide resin and/or polyimide resin in a co-solvent mixture of N-methyl pyrrolidone and acetophenone having a percent polymer solids in solution of between about 5 percent and 40 percent by weight based on the total weight of the solution.

It is the primary object of this invention to provide an improved solvent system for polyamide-imide and/or polyimide resins useful as magnet wire coating compositions.

It is a further object of this invention to provide an alternative solvent system for the high temperature polyamide-imide and/or polyimide resins that would (a) have the advantage of N-methyl pyrrolidone solvent but would not have the high affinity for water as does N-methyl pyrrolidone, (b) have low toxicity and (c) be of moderate to low cost. Thus, the advantages of employing acetophenone along with N-methyl pyrrolidone (NMP) as a solvent for the amide-imide and/or imide polymers is that acetophenone has (1) good solvency and polymer compatibility with the NMP, (2) acetophenone has a high boiling point (202° C.) the same as NMP which promotes even drying of coating compositions, (3) acetophenone has a high flash point (82° C. or 180° F.), (4) acetophenone has a low water solubility, i.e., 0.68 weight percent at 25° C. whereas NMP is completely miscible with water and (5) acetophenone has a low toxicity and is of moderate cost as compared to NMP which is expensive.

DETAILED DESCRIPTION OF THE INVENTION

According to the present invention, coating compositions are prepared which comprise amide-imide and/or imide polymers in a mixed solvent solution of from about 10 to 90% by weight N-methyl pyrrolidone and correspondingly from about 90 to 10% by weight acetophenone, the solids content of the polymers in solution being between about 5 and 40 percent by weight based on the total weight of the solution. Preferably the mixed solvent solutions are from 50 to 80% by weight N-methyl pyrrolidone and correspondingly from 50 to 20% by weight acetophenone. The solids content of the polymers in solution is preferably between 10 and 20 weight percent based on the total weight of the solution to provide the most efficient workable viscosity for coating compositions, especially magnet wire coating compositions.

The amide-imide polymers employed in the present invention are known in the art and may be prepared by the methods described in U.S. Pat. No. 3,677,992, July 18, 1972 and incorporated herein by reference. Typical of the polyamide-imides which may be used are those sold commercially as "Amoco AI-10" (Amoco Chemicals Corporation). A typical polyamide-imide is for example a condensation polymer of trimellitic anhydride and aromatic diamines having the general formula:

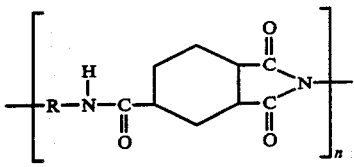

These polymers are resistant to high temperatures and are sold as solid resin powders or for example dissolved in a solvent such as N-methyl pyrrolidone.

Polyimide resins employed in the present invention are also known in the art and may be prepared for example by the methods described in U.S. Pat. Nos. 3,179,634, 3,501,443 and 3,607,814 as well as such methods as set forth in the Encyclopedia of Polymer Science and Technology, Vol. 11, pp 247-272 and incorporated herein by reference. Typical of the polyimide resins which may be used are sold commercially as "Skybond 705" (Monsanto Plastics & Resins Co.) and are high heat resistant resins. Such resins are generally sold as a 20% solids solution in N-methyl pyrrolidone. Polyimide resins are generally defined as those polymers having the repeating imide linkage

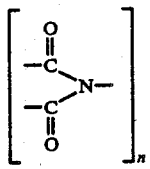

in the main chain and are derived from aromatic dianhydride such as pyromellitic dianhydride and an aliphatic or aromatic diamine.

The acetophenone employed should preferably be of high purity, i.e. at least 98.5% in order that the boiling point will be uniformly high and the same as N-Methyl pyrrolidone. Impurities may cause polymer incompatibility with the mixed solvents and may cause precipitation of the polymer from solution, or an uneven coating on the substrate.

The following examples are provided to illustrate the invention in accordance with the principles of this invention, including examples of a comparative nature, but are not to be construed as limiting the invention in any way except as indicated by the appended claims.

EXAMPLES 1 TO 6

In Examples 1 to 6, which follow in Table form, a 50 g. solution of a polyimide ("Skybond" 705) resin having 20% solids in N-methyl pyrrolidone (NMP) with some xylene (approximately 5 percent by weight) and a viscosity of 1628 cps at 25° C. was diluted with additional N-Methyl pyrrolidone (NMP), acetophenone (ACP) and other solvents to show the compatibility with the polyimide polymer diluted from 20% solids to 10% solids and lower. It can be noticed that acetophenone (ACP) effectively reduces the viscosity and can be used down to 5% solids without causing any polymer incompatibility. Examples 4-6 show that common solvents cannot be used in the same manner and cause precipitation of the polymer. The use of acetaphenone as a solvent did not affect the final magnet wire coating. The results are summarized in Table 1 below:

TABLE 1

Solubility of Polyimide Resin in Various Solvents

| | Added Solvent | Final Wt. % Solids | Solubility | Viscosity CPS at 25° C. |
|---|---|---|---|---|
| Ex 1 | NMP | 10 | soluble | 67 |
| Ex 2 | ACP | 10 | soluble | 91 |
| Ex 3 | ACP | 5 | soluble | 34 |
| Ex 4 | xylene | 10 | insoluble | — |
| Ex 5 | acetone | 10 | insoluble | — |
| Ex 6 | ethanol | 10 | insoluble | — |

EXAMPLES 7-12

Examples 7-12 set forth below demonstrate the solubility of polyamide-imide with acetophenone and N-methyl pyrrolidone at high solids levels. At 40% solids, acetophenone can be used to replace up to half of the N-methyl pyrrolidone as solvent (Example 9) even though viscosity is higher. The Examples also show that whereas the polymer is insoluble in acetophenone (Example 8) at 20%, small amount of N-methyl pyrrolidone in acetophenone promote polymer solubility (Example 12).

EXAMPLE 7

60 g. of N-methyl pyrrolidone was added to a bottle. 40 g. of "Amoco AI-10" a powdered polyamide-imide manufactured by the Amoco Chemicals Corporation was added slowly at about 5 g. at a time and the contents of the bottle shaken between each addition to give a 40% resins solids solution. At the end of 1 hour, most of the polymer was in solution. At the end of 2 hours, the solution was clear. The viscosity was 3350 cps at 25° C.

EXAMPLE 8

Example 7 was repeated except that acetophenone was substituted for the N-methyl pyrrolidone to form a 20% solids solution. After 2 hours, the polymer had not completely gone into solution. On further standing the polymer remained incompletely soluble.

EXAMPLE 9

To a blend of 30 g. N-methyl pyrrolidone and 30 g. acetophenone, 40 g. of the same type powdered polyamide-imide employed in Example 7 was slowly added forming a 40% solids solution. The solution remained clear indicating complete solubility. Viscosity was 5750 cps at 25° C.

EXAMPLE 10

100 g. N-methyl pyrrolidone was added to a 500 ml glass resin kettle equipped with a mechanical stirrer. 25 g. of powdered polyamide-imide ("Amoco AI-10") was gradually added. After 1 hour the time the polymer addition was completed most of the polyamide-imide was in solution. At the end of 2 hours, the polymer was completely in solution and the stirrer was turned off. The viscosity was 124 cps at 25° C. The solution was further diluted with 125 g. N-methyl pyrrolidone. The polymer was completely soluble with a viscosity of 13 cps at 25° C.

EXAMPLE 11

20 g. of polyamide-imide copolymer ("Amoco AI-10") was gradually added to a bottle containing 40 g. N-methylpyrrolidone (33% solids). After 4 hours most of the polymer was in solution. To the polymer solution 40 g. of acetophenone was added. A clear solution was obtained. By contrast 40 g. acetophenone was blended with 40 g. N-methyl pyrrolidone. 20 g. powdered polyamide-imide ("Amoco AI-10") was slowly added with stirring after 2 hours the polymer was in solution. Viscosity was 188 cps at 25° C.

EXAMPLE 12

90 g. acetophenone was blended with 10 g. N-methyl pyrrolidone. 25 g. powdered polyamide-imide ("Amoco AI-10") was added with stirring. The polymer was completely soluble in about 8 hours time with constant stirring. Viscosity was 440 cps at 25° C.

EXAMPLES 13-17

Examples 13-17 which follow in Table form show that the higher solids solutions 20% and 40% can be effectively reduced with acetophenone down to a final 10% solids level. Solution viscosity is comparable to that obtained with only N-methyl pyrrolidone (Example 13). Results are summarized in Table 2.

TABLE 2

| Ex. No. | Starting Solids % | Original Solvent Composition | | Final Solids % | Wt % ACP in Final Solvent | Additional Solvent | | Polymer Solubility | Viscosity CPS @ 25° C. |
|---|---|---|---|---|---|---|---|---|---|
| | | % NMP | % NCP | | | % NMP | % ACP | | |
| 13 | 20 | 100 | — | 10 | — | 100 | — | soluble | 13 |
| 14 | 20 | 100 | — | 10 | 56 | — | 100 | soluble | 19 |
| 15 | 20 | 50 | 50 | 10 | 78 | — | 100 | soluble | 22 |
| 16 | 20 | 10 | 90 | 10 | 96 | — | 100 | insoluble | — |
| 17 | 40 | 50 | 50 | 10 | 92 | — | 100 | soluble | 21 |

EXAMPLE 18

Polymer blends from Examples 1 and 2 and 14, 15 and 17 were used to coat copper magnet wire in the following manner:

The magnet wire was dipped or passed through pads containing polymer solution. It was put in a 50° C. air convection oven for about 30 minutes in order to remove solvent. This procedure was repeated a second time. The resin was cured at 230° C. for 30 minutes. Clear smooth enamels were obtained on curing. Enamels from acetophenone-containing polymer solutions (Examples 14, 15 and 17) were indistinguishable from those containing only N-methyl pyrrolidone as solvent.

What is claimed is:

1. A coating composition comprising a polymer selected from polyamide-imides and polyimides dissolved in a mixture of solvents which consist essentially of
   (a) from about 10 percent to about 90 percent by weight N-methyl pyrrolidone and
   (b) correspondingly from about 90 percent to about 10 percent by weight acetophenone wherein the solids content of the polymer solvent solution is between about 5 percent and 40 percent by weight based on the total weight of solution, said acetophenone having a purity of at least 98.5 percent.

2. A coating composition according to claim 1 wherein the polymer is a polyamide-imide.

3. A coating composition according to claim 1 wherein the polymer is a polyimide.

4. A coating composition accordin to claim 1 wherein the solids content is between 10 percent and 20 percent by weight based on the total weight of solution.

5. A coating composition according to claim 4 wherein the N-methyl pyrrolidone is between 50 and 80 percent by weight and acetophenone is between 20 and 50 percent by weight.

* * * * *